United States Patent
Lunev (10) Patent No.: US 9,003,131 B1
(45) Date of Patent: Apr. 7, 2015

(54) METHOD AND SYSTEM FOR MAINTAINING CONTEXT EVENT LOGS WITHOUT LOCKING IN VIRTUAL MACHINE

(71) Applicant: Parallels IP Holdings GmbH, Schaffhausen (CH)

(72) Inventor: Denis Lunev, Moscow (RU)

(73) Assignee: Parallels IP Holdings GmbH, Schaffhausen (CH)

( * ) Notice: Subject to any disclaimer, the term of this patent is extended or adjusted under 35 U.S.C. 154(b) by 210 days.

(21) Appl. No.: 13/851,154

(22) Filed: Mar. 27, 2013

(51) Int. Cl.
*G06F 12/10* (2006.01)
*G06F 3/06* (2006.01)

(52) U.S. Cl.
CPC .................................... *G06F 3/0668* (2013.01)

(58) Field of Classification Search
None
See application file for complete search history.

(56) References Cited

U.S. PATENT DOCUMENTS 5,864,713 A * 1/1999 Terry ............................... 710/52

* cited by examiner

*Primary Examiner* — Duc Doan
(74) *Attorney, Agent, or Firm* — Bardmesser Law Group (57) ABSTRACT

System for working with shared memory includes a plurality of contexts, each having executable processes writing and reading data; a ring buffer in the shared memory for writing and reading data by the contexts; a software primitive manages access attempts by the contexts to the ring buffer. Each context, upon writing to the ring buffer, is allocated an amount of space up to a maximum available at that moment. The software primitive guarantees consistency of the data written to the ring buffer. The software primitive permits simultaneous writing into the buffer by multiple contexts. After finishing writing to the buffer, the context updates a state of the buffer by decrementing the count of the active writers and/or by shifting the permitting pointers for communicating with writers and readers. A context can read from the buffer only data is marked as valid for reading by the context that wrote that data.

11 Claims, 7 Drawing Sheets

METHOD AND SYSTEM FOR MAINTAINING CONTEXT EVENT LOGS WITHOUT LOCKING IN VIRTUAL MACHINE

BACKGROUND OF THE INVENTION

1. Field of the Invention

The present invention relates to logging events from different contexts, and more particularly, to maintaining logs of the events occurring in virtual environments, such as Virtual Machines. The present invention is also related to organizing interprocess communication as it relates to concurrent use of physical memory, and more particularly, to managing concurrent threads and processes of virtual machines working in different context, where it is undesirable for these context to block each other. More generally, the present invention is applicable to computer programs that work on multiple-processor or multi-core processor architectures, where different context needs to buffer their data into the same address space at the same time, independent of each other.

2. Description of the Related Art

With Virtual Machine (VM) technology, a user can create and run multiple operating environments on a host server at the same time. Each virtual environment, or Virtual Machine, requires its own operating system (OS) and can run execution contexts independently. The VM software provides a layer between the computing, storage, and networking hardware and the software that runs on it.

Each VM acts as a separate execution environment, which reduces risk and allows developers to quickly re-create different operating system (OS) configurations or compare versions of applications designed for different OS's for as long as the integrity of data used by each of the VMs is provided. Generally, a Virtual Machine is an environment that is launched on a particular processor (a client machine) that is running a host operating system (HOS) and is connected to a data storage located on a server that stores VM data.

Each VM can have several execution contexts with the events that need to be logged. The contexts can be Virtual Machines (VMs) and various applications. Currently, there are a number of conventional methods that relate to event logging. However, in terms of virtualization, logging of the events executed within different contexts presents considerable challenges. Recording the event logs from different contexts can trigger stopping (locking) of the contexts when the logs of the events occurring in different contexts (i.e., in different VMs) are recorded in parallel. Conventionally, a context, which writes data into a common log, needs to receive a notification that a file is available for writes. Writing into a file blocks the context, so the context log cannot be recorded without locking the context. Keeping separate logs within different contexts raises logs synchronization problem, because logs have different addresses within different contexts.

Modern computer architectures experience certain difficulties when it comes to increasing their performance and giving guarantees, using software mechanisms, for optimizing management of concurrently executed threads. Standard synchronization primitives of the processes that are being executed assumes blocking of a resource, when one process addresses a particular memory location or space, or more generally executes some code that requires that particular resource, then other processes are switched to a waiting mode.

Blocking in or itself, is already a form of slowdown of the process being executed. Since the processes need to execute sequentially, waiting for their turn once a particular process "grabs" a resource (for example, by setting a "busy" flag for the right to address a particular memory area), some of the popular primitives used to synchronize are semaphores, mutexes, and monitors. If a computer has a single processor, then a queue of processes with blocking is the only method for ordering the aggression of the memory, if different processes try to execute the access attempt at the same time. If the computer has a multi-core architecture, or has multiple processors, then such a process queue is no longer the optimal solution, since as many processes can execute as there are cores or processors in the system.

Second, the blocking approach is not always possible to apply. For example, when different context compete with each other, this approach is problematic. Thus, if the basic spinlock synchronization primitive is used, then those contexts that compete with the owner of the spinlock have to remain idle, since they also require the spinlock.

Third, the blocking algorithm can sometimes produce deadlock—a form of dead end situation, where each processes of a group awaits an event that only another process from the same group can generate. In this case, when there's a problem with a process that grabs the spinlock, all competing processes "hang".

Fourth, there are difficulties that are particularly relevant to multi-core and multiprocessor architectures. For example, the process running on one core cannot affect or put into a queue a scheduler of another core. The scheduler, in this case, has higher priority. In this event, a likely situation will occur that the scheduler will damage the process of a neighboring core, even if that process used standard synchronization primitives.

With virtual machines, restrictions on the use of standard blocking methods for synchronizing processes are even more strict. The primary reason for this is that virtual machines all work in different context. In a virtual machine, there is a particular problem regarding logs of events, and in particular, a log of events of competing processes generally. Specifically, it is not possible to permit mutual exclusivity by writers of different context upon different context using standard methods since one possibility of a context is the host operating system, the guest operating system, a hypervisor, which might "live" in a separate context), with a possibility of blocked interrupts.

Thus, any algorithm of non-blocked synchronization has to have three levels of guarantees, from the weakest to the strongest in order:

Obstruction-free writing—if a process or thread, launched at any time, given that execution of competing threads is on hold, finish its work in a specified number of steps. Synchronization using mutexes, for example, fails to satisfy even this weakest requirement.

Lock-free operation—for example, a thread can theoretically run in an infinite loop, however, each iteration means that some other thread has completed some discrete action, in other words, the work of the system has not stopped.

Wait-free operation—where each operation is performed in a finite number of steps, which does not depend on other threads. This is the strictest guarantee of progress.

An important aspect of the present invention is guaranteeing that even where the data write procedure by a user of his data into a buffer is spread over time, other users at that time do not need to be idle, but can also write their data into the buffer.

The algorithm for working with competing contexts described in the present application satisfies all these requirements.

An important characteristic of the ring buffer, which is a key ingredient for non-blocking implementation, is the fact that when reaching the last element of the array of memory cells of a buffer, both the writer and the reader, independently of each other, return back to the first element of the array. Most of the practical use of the ring buffer is focused around the situation of a single writer and a single reader. However, these conventional algorithm exclusions cannot be scaled to a situation with multiple writers and/or multiple readers. A number of first in first out (FIFO) solutions exist for buffers located in physical memory. For example, U.S. Pat. No. 7,925,804 addresses the slowdown of data transmission from one bus to another by accumulating requests in an intermediate FIFO buffer, with a subsequent transmission of all the data for all requests as if it were a single request.

U.S. Pat. No. 8,015,367 describes working with memory given different context, by translating the address space of the context (i.e., of each virtual machine) into the host OS memory, and using a count buffer to store information about the number of entries from each context.

U.S. Pat. No. 6,904,475 contemplates the use of a FIFO buffer to temporarily store a data stream from the IEEE 1394 bus intended for IO devices, and for processing these streams prior to outputting them, based on instructions received in real time from a user application.

U.S. Pat. No. 7,945,761 describes a method and a system for maintaining validity of cached mappings corresponding to virtual addresses in guest page tables. When creating the FIFO buffer, memory mapping is used, where a region in a virtual memory of a virtual machine is made to correspond to a region in a memory of the host.

U.S. Pat. No. 7,117,481 describes a system of concurrent access to by different processes to the same resource, where the processes belong to different domains. In this patent, the semaphore synchronization primitive is used, with mutual blocking of competing processes.

U.S. Pat. No. 8,099,546 describes a mechanism for a lock-less ring buffer in an overwrite mode, which includes aligning the addresses in a memory for each page of the ring buffer, in order to perform masking bits in addresses, which are used as a flag representing the state of the page, and using two least significant bits of the addresses to show the state of the flag of the page. The state can be one of three possibilities—header, update and normal. The described method includes a combined action: (a) moving the head page pointer to the head page pointer of the ring buffer, with cropping of the head page and the page being read; (b) changing the state of the flag of the head page into the normal state; (c) changing the state of the flag of the next page, after the head page, to the header state; and (d) moving the head and tail pages of the buffer, which means resetting the flags representing the states of one or more of the pointers of the buffer pages, associated with the head and tail pages.

U.S. Pat. No. 8,127,074 describes a mechanism for a reader page for a ring buffer, where a block of information from storage is separated from ring buffer storage in the form of a page, for a reader of the buffer. The ring buffer is located in physical memory, and the copying is done so that the readers' page becomes part of the ring buffer, and the head page no longer belongs to the buffer.

U.S. Pat. No. 8,271,996 describes a method of event notifications, generated by writers, for those readers who subscribe to the notifications, and without the use of kernel space. Everything is performed in user space by creating a ring buffer in shared memory. Each event can be executed in its own address space.

U.S. Patent Publication No. 2009/0204755 describes a multi-reader, multi-writer lock free ring buffer, and also describes a non-blocking algorithm for working with the ring buffer. The algorithm uses indices of writers and readers. Each writer and reader has his own reserved index value and done index value. These represent a cell that is reserved for some action, and a cell upon which the action has already been performed. The algorithm constantly compares them, and based on the comparison, moves the position pointer for writing or reading.

In this publication, the algorithm contemplates only a relatively short time for writing into the buffer by a single writer, therefore, it does not permit writing large amounts of data on each iteration, since this can lead to blocking—where other writers will have to be idle. That means that each successive writer, in this algorithm, waits for the previous writer to finish. What is needed is a more universal algorithm, where a large amount of data being written by one writer does not prevent others from writing as well.

U.S. Patent Publication No. 2010/0332755 describes a hardware and software solution to improve synchronization between threads in a system having a multi-core processor. The hardware part includes a first processor and a second processor, and a common ring buffer stored in a memory, for data storage. Also, the memory storage global variables associated with accessing the ring buffer. The first processor core launches a first thread, and has a first cache, associated with it. The first cache stores a first set of local variables associated with the first processor core. The first thread controls writing of the data into the shared ring buffer, using one global variable and a first set of local variables. These second processor core launches a second thread, and has a second cache associated with it. The second cache stores a second set of local variables associated with a second processor core. The second thread controls reading of the data from the shared buffer, using at least one global variable and a second set of local variables.

U.S. Patent Publication No. 2011/0131352 describes a method for writing into a limited ring buffer. A network adapter can determine that the data is ready for writing into the ring buffer, and after that, once the network adapter determines that the read index is not equal to the write index, then this data is ready for writing into the buffer. The network of data writes the data into the memory, which is pointed to by the write index on a physical storage medium. The memory that is pointed to by the index have an offset and the memory includes the data itself and a validity bit. The network adapter writes the time of the index entry into the validity bit, and then adds one to the entry after writing the data into the memory.

Accordingly, a method and system for recording common logs of the context events without stopping or slowing down (locking) the context execution is desired.

SUMMARY OF THE INVENTION

The present invention is related to a method and system for logging events from different contexts, and more particularly, to maintaining logs of the events occurring in virtual environments that substantially obviates one or more of the problems and disadvantages of the related art.

The present invention proposes a new primitive for a working with a shared ring buffer with one reader and N writers, as a non-blocking implementation. Any non-blocking method, in this field, needs to address interaction between the processes and their queues, which is a non-trivial task. The objective of the invention is to avoid the use of the spinlock primitive, which is unacceptable in user space application programming.

The proposed method is used when it is necessary to write data from different contexts into the physical memory. For the application code, which is responsible for managing virtual machines, a programming primitive of a ring buffer type is created, which works on a principle described below. The proposed primitive guarantees:

(i) Allocation of space for data of each context requesting the space, within the accessible address space of the physical memory;

(ii) Blocking-free synchronization when competing writers—context attempt to access the buffer;

(iii) Consistency of the data written to the buffer;

(iv) Support of an arbitrary number of writing contexts;

(v) The ability to delete data of a given context from a buffer to free up space, after the data has been read by a context.

As a result, the effectiveness, speed and reliability of writing to the buffer is increased, due to the absence of conflicts between the contexts, which do not arise since the primitive does not permit competing contexts to write their data into the buffer simultaneously.

In one aspect, there is provided a system for working with shared memory of a computer, including a plurality of contexts, each having executable processes writing and reading log data; a ring buffer in the shared memory for writing and reading log data by the plurality of contexts; a software primitive for managing access attempts by the contexts to the ring buffer; wherein each context, upon writing to the ring buffer, is allocated an amount of space requested by the context, up to a maximum available amount of space at any moment in time; wherein the software primitive guarantees consistency of the log data written to the ring buffer, where entries from the same context are grouped together for writing and reading; wherein the software primitive permits simultaneous writing into the ring buffer by multiple contexts; wherein a context that finished writing last opens for reading log data of all other contexts in the ring buffer; wherein a context that finished writing can open his log data for reading by other contexts; wherein, after finishing writing to the ring buffer, the context updates a state of the buffer by decrementing the count of the active writers and may be by shifting the permitting pointers for communicating with writers and readers; and wherein a context can read from the buffer only the log data that is marked as valid for reading by the context that wrote that data.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF EMBODIMENTS OF THE INVENTION

Reference will now be made in detail to the embodiments of the present invention, examples of which are illustrated in the accompanying drawings.

DEFINITIONS

Atomic operation—an action or sequence of actions, which is executed as a single hole, or not executed at all. Atomicity of operations—is particularly important in multiprocessor computers (and multitasking operating systems), since access to resources that cannot be divided must be atomic by nature. An atomic operation is open to the influence of only a single thread. Atomicity can be hardware (when the uninterrupted nature of the atomic process or step is guaranteed by the hardware) or software (where special mechanisms for inner process communications are used, such as semaphores and mutexes).

Bit by bit operation—some operations over sequences of this can be referred to as bit by bit operations. In software development, only some types of search operations are typically considered, such as logical bit wise operations and bit shifts. For example, in C++, the result of the expression "2 && 1" (a logical AND) is the Boolean variable TRUE, while the result of the expression "2 & 1" (bit by bit AND) is integer 0.

Logging—a record of the work of a program, written into the memory of a computer during the execution of the program. Typically, the information that is logged is defined by the software developer. Typical entries can include start time finish time, certain software operations, error records, and so on. The operating system also typically keeps its own logs, including logs related to the work of other programs, such as user applications. In UNIX and LINUX, operating system logs are written into the /var/log/ directory, while in Microsoft Windows, logs are typically written to a registry. Processes and context are typically divided into readers and writers, in terms of their functional roles. In a sense, these are applications, including some operating system processes, which can write logs both for their own needs as well as for the needs of the operating system, and also can read their own logs and other processes' logs, wherever necessary.

Shared memory—memory that is used to increase the speed of data exchange between processes. In a conventional situation, the exchange of data between processes is done through the CPU core. Shared memory, on the other hand, permits exchange of data not through the CPU core, but by using a portion of the virtual address space, where data can be written to and read from.

Physical memory—memory, which is addressed based on actual data location within it. Unlike virtual memory, where the addresses do not reflect actual data positions, physical memory is addressed through links. The addresses of a virtual memory are the links to the address of the physical memory due to piecewise-linear transformation in hardware-software. Virtual memory makes application programming easier by hiding fragmentation of physical memory.

FIFO—first in, first out, which is a method for organizing concurrent access to data storage. FIFO means that a block of information written to the buffer first will be read before a block of information that is written to the buffer second.

Ring buffer—a data structure, using a single buffer of a fixed size, as if after the last element of the buffer, the first element of the buffer immediately follows. Typically, ring buffers are used for buffering data streams;

semaphore—an inter-process communication (IPC), that permits no more than a strictly defined number of threads to execute the code. Semaphores are often used when sharing data through shared memory.

mutex—a binary semaphore, such that only a single thread can execute the code;

Spinlock—the lowest level of synchronization primitive, which captures the mutex, and on which all other synchronization mechanisms are based. Physically, the spinlock is a variable located in memory, and is implemented using atomic operations, which must be present in the processors instruction set. Each processor core, that wishes access a shared resource, atomically writes a "busy" value into the variable, using some analog of the slot operation (in the X86 architecture this analog is the XCHG instruction). If the previous value of the variable, which is returned by the command, was "free", then the processor making the request, is granted access to the shared resource, otherwise, the processor returns to the swap operation and cycles through the wait cycle, until the spinlock is free. After working with a shared resource, the processor that at the moment owns the spinlock needs to write the "free" value into the spinlock.

memory-mapped file—a segment of virtual memory which has been assigned a direct byte-for-byte correlation with some portion of a file or file-like resource.

VEE—Virtual Execution Environment, a type of environment that supports program code execution, where at least a part of the real hardware and software required for running program code are presented as their virtual analogs. From the point of view of the user, the code in VEE runs as if it were running on the real computing system. An example of VEE is a Virtual Machine (VM).

VM—Virtual Machine, a type of an isolated Virtual Execution Environments running on the same physical machine simultaneously. Each Virtual Machine instance executes its own OS kernel. Support of Virtual Machines is implemented using a Virtual Machine Monitor and/or a Hypervisor.

VE—Virtual Environment, for example, a Virtual Private Server (VPS), is one type of a Virtual Execution Environment (VEE) running on the same hardware system with a shared OS kernel and most of the system resources, where isolation of Virtual Execution Environments is implemented on the namespace level.

A Virtual Private Server (VPS), sometimes referred to as a "container" is a closed set, or collection, of processes, system resources, users, groups of users, objects and data structures. Each VPS virtualizes the OS, and has its own ID, or some other identifier, that distinguishes it from other VPSs.

The VPS offers to its users a service that is functionally substantially equivalent to a standalone server with a remote access. From the perspective of an administrator of the VPS, the VPS should preferably act the same as a dedicated computer at a data center. For example, it is desirable for the administrator of the VPS to have the same remote access to the server through the Internet, the same ability to reload the server, load system and application software, authorize VPS users, establish disk space quotas of the users and user groups, support storage area networks (SANs), set up and configure network connections and web servers, etc.

In other words, the full range of system administrator functions is desirable, as if the VPS were a dedicated remote server, with the existence of the VPS being transparent from the perspective of both the VPS user and the VPS administrator.

VM—Virtual Machine, a type of an isolated Virtual Execution Environment running on the same physical machine simultaneously.

Hypervisor—controls software, while having the highest privilege level for administrating hardware computer resources and Virtual Machines.

A VEE, according to an exemplary embodiment, can be any of a Virtual Private Server, a Virtual Machine, a Hypervisor-based Virtual Machine, and a Lightweight Hypervisor-based Virtual Machine, a session of Terminal Server Windows 2003 (or older) and a session of Citrix Presentation Server, Lightweight Hypervisor-based Virtual Machines, VMM-based VMs or hypervisor-based VMs.

In the specific case as applied to virtual machines, the context can be a process or a group of processes that belong to virtual machine, virtual machine monitor, hypervisor, user space processes, and/or the guest operating system. When a context wants to write data (for example, its own log data) into the memory, it addresses the FIFO ring buffer (hereafter "buffer", for simplicity), which was previously created by the application.

The context (which is often an application, and often referred to as "writer" in this description) seize an index of the memory cell, from which it can begin writing. This index will be referred to as rb_tail. The writer plans to shift rb_tail+size (where size is the amount of data that the writer is writing to the memory). Consequently, when the next writer attempts to write to the buffer, it will use a new rb_tail. Writing to the buffer starts after a successful reservation of space in the buffer, and can be extended in turn, without interfering with other writers writing to the same buffer at the same time, unlike the conventional art.

Allocation of memory in the index space or writing of data into the buffer is designed so that if rb_tail changes after the start of the reservation process of the writer in the buffer and before the end of the process, then the space will not be allocated. The writer will then need to make a second attempt, against starting by allocating a new rb_tail+size. The number of such attempts can be no greater than the number of writers that are in the same stage of working with a buffer—requesting space in the buffer, but not yet received the space. Reservation of the space is normally successful in all cases, except certain extraordinary situations, where the writer is a process with a very high priority.

The primitive for working with the buffer includes three primary procedures:

reserve—registering a user with reserving space in the buffer;

copying—copy of user data to a dedicated memory space;

commit—removal of user registration and possibly giving the user permission to read the stored data.

The simultaneous activities by the writers are built around a special structure shadow_tail, which represents a 64 bit integer. The number is selected to make atomic writes and reads by the processor easier. The first 32 bits are allocated for the number of active users that are working with the buffer. The second 32 bits are allocated to the index of the starting memory cell, from which the writing will begin. In code, this means that a local variable of the type union (using C++ notation) is declared as follows:

union shadow_tail next:

Note that next.u will contain two portions of the variable: next.s.users, which is the counter of writers, and next.s.tail_idx, which is the index, or address, of the starting memory cell.

The basics of the operation of the synchronization primitive of the present invention are somewhat similar to conventional FIFO buffers, but with significant optimizations that enable writing without delays, when the competing processes try to store their data in the ring buffer.

Writing to the Buffer

Figure 3:
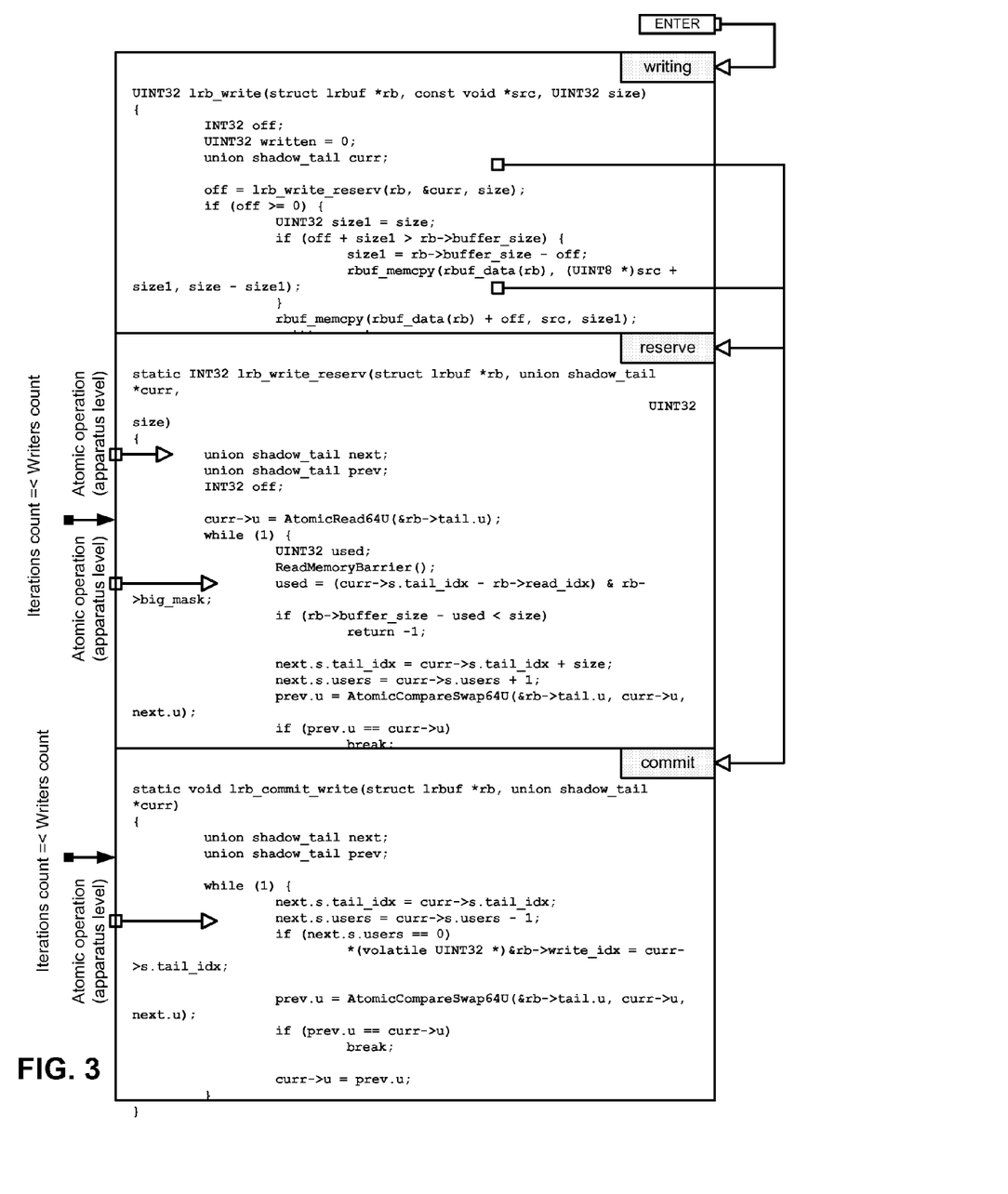
FIG. 3 shows the code responsible for the working of the writers to the ring buffer of the present invention.

The beneficial effect is achieved based on the code shown in FIG. 3. In essence, the code highlights the features of the synchronization primitive of a new type, whose objective is to provide for conflict-free writing of data by multiple users into a shared memory, when there is a single reader. The principle is also applicable to the case of multiple readers, however, such a case will most likely operate in a suboptimal fashion, since such a code must contain atomic operations for multiple readers, even though such atomicity is not, strictly speaking, necessary.

Figure 4:
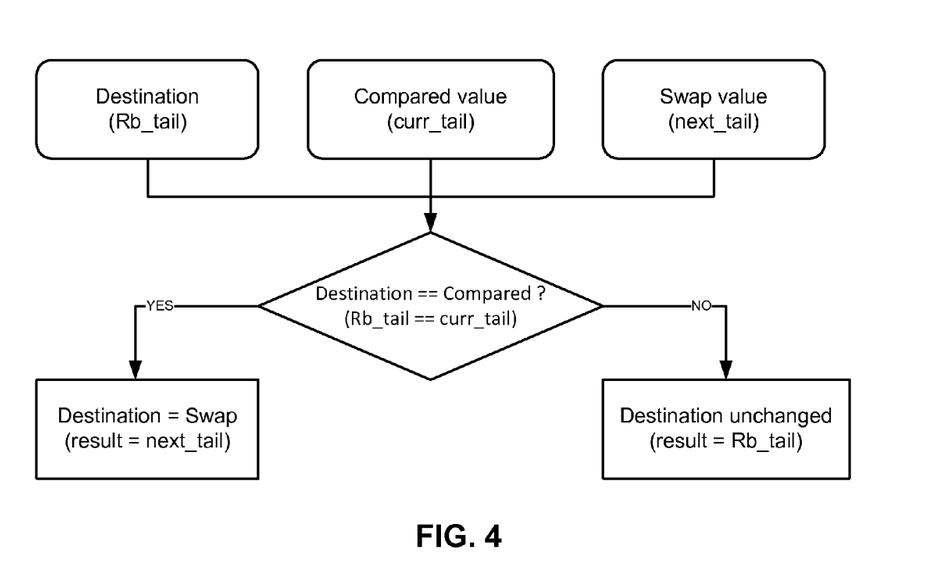
FIG. 4 is a schematic of the compare and swap (CAS) processor instruction, as it applies to the present invention.

The code illustrated in FIG. 3 is launched once by a single reader. The entry point is the function lrb_write( ), from the which the function lrb_write_reserve( ) is invoked by a writer reserving of space in the buffer starts with an atomic read operation:

curr→u=AtomicRead64U(&rb→tail.u);

The reservation ends after the atomic compare operation:

prev.u=AtomicCompareSwap64U(&rb→tail.u, curr→u, next.u);

The logic of operation of a hardware level instruction of the compare and swap type (CAS) is illustrated in FIG. 4. Here, the values of the global rb_tail index of the ring buffer (rb→tail.u) is compared with the local index curr→u, which is defined by the writer prior to reserving the space in the buffer (in other words, the tail index of points to the address of a cell in the buffer, from which writing can begin). The difference between "global" and "local" is in that the global variables are visible to all the writers, while the local variables are visible only to the writer that declared the local data structure. If the comparison is true (i.e., rb→tail.u=curr→u) then the result is scored in the variable next.u. At the same time, the scheme guarantees that the value will be written properly, if, after the beginning of the comparison, the value of rb→tail.u has not changed (in other words no other writer has changed the value). Then, subsequent manipulations of the variables have the effect that the global structure rb→tail.u receives a value that is increased by the variable "size", so that all the writers can see the change.

If rb→tail.u is not the same as curr→u (i.e., the buffer has changed since the time of the start of the registration), the structure prev.u, and through it, the structure curr→u is assigned the current value of rb→tail.u, and the registration cycle and the reservation process repeats. Even though the construct while (1) { . . . } is an infinite loop, in practice, it cannot be invoked more times than the number of potentially active writers to the buffer. This is because the exit condition from the loop is the equality of local and global tail variable, and the local and global tail variables become equal at the beginning of the next iteration. Only a writer can change the global tail, and only during the reservation. The code is constructed so that on each iteration over all writer processes one writer process is guaranteed to leave the loop and obtain his buffer. Therefore, the infinite loop will never actually be infinite. This effectively means that where the wait time is guaranteed to have no more iterations than the number of potentially active writers, as well as writers who are trying to register.

If the writer registers, then he is guaranteed to be able to write his data into the buffer, regardless of what other writers are doing. Note that writing is inherently not an atomic operation, since it occurs in the middle of the function lrb_write( ).

Figure 2:
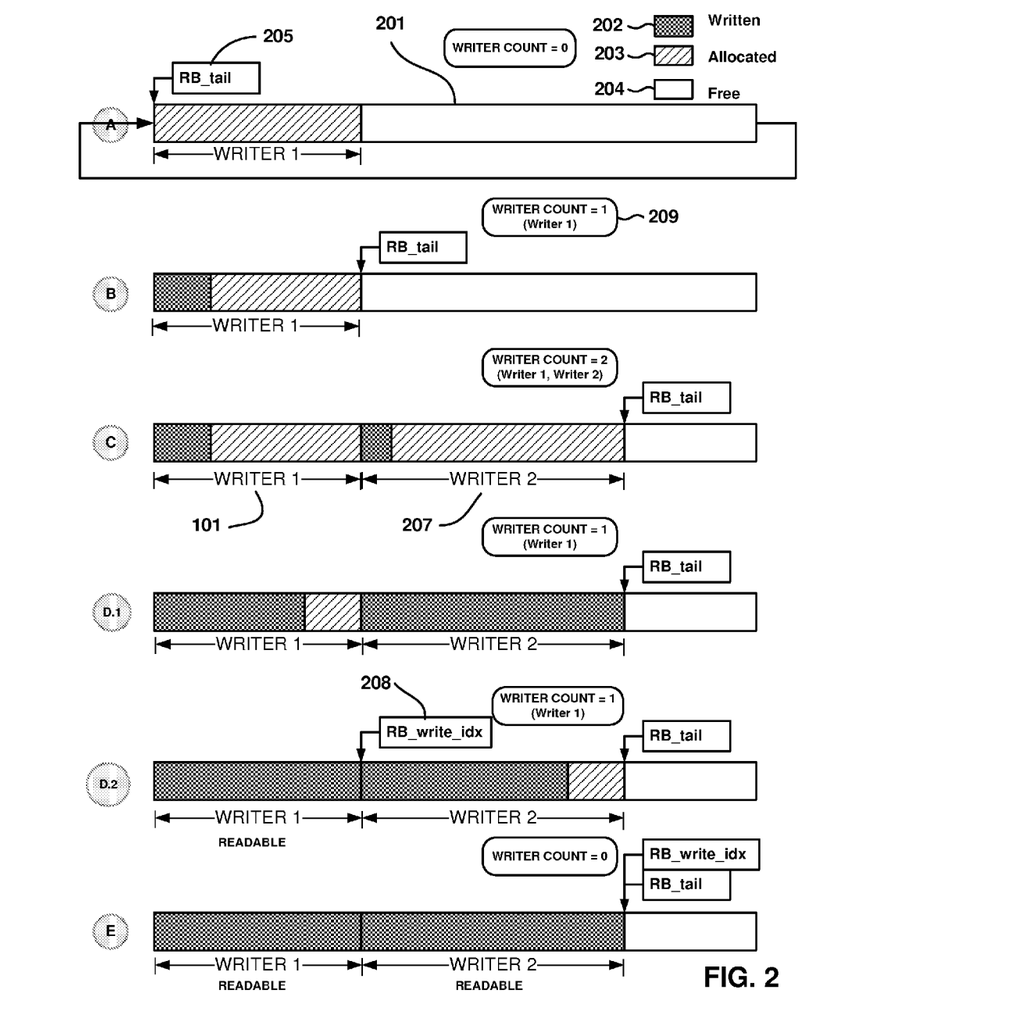
FIG. 2 shows the cross sections of the states of the ring buffer when multiple writers are writing to it.

For a writer, opening his data for reading by other context depends on the actions of other writers, who have not yet finished their writing process. The flag regarding finishing the write process is set through the function lrb_commit_write( ). If, during the permit function, it turns out that the writer is the last active writer who is writing to the buffer (in other words, either there were no other writers, or all the other writers have already finished writing), or he was the first one to have started writing, then this writer moves the pointer rb→write_idx. If a writer is not the last one then he simply leaves the function, and does not return to the buffer anymore. His data will be open to reading by the last writer, by moving the rb→write_idx pointer, which means opening all the data for reading, that were previously written into the buffer up to this address. FIG. 2, diagrams D.1 and D.2 illustrates this in greater detail.

Figure 1:
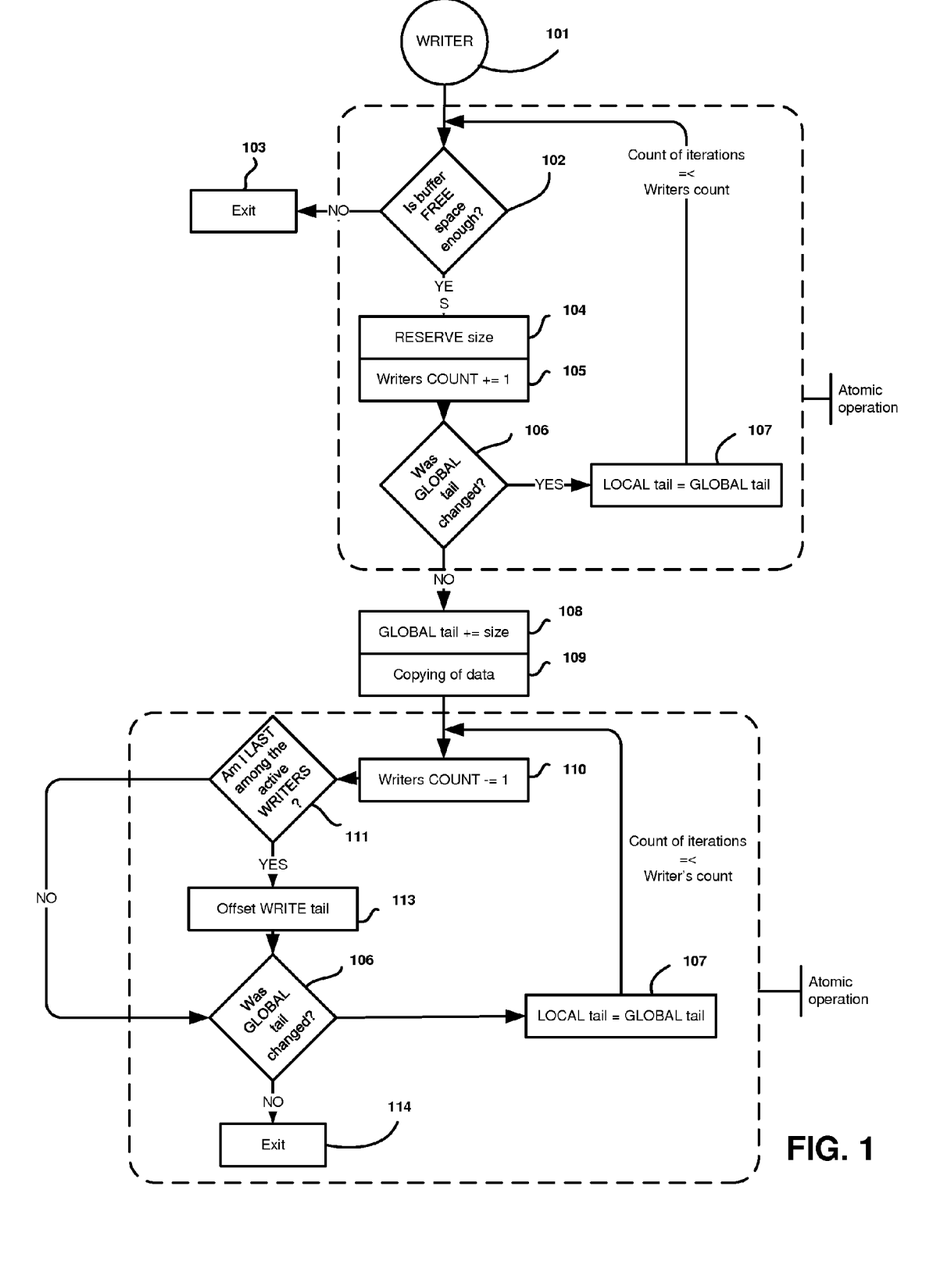
FIG. 1 illustrates a schematic of the lifecycle of one writer to the ring buffer.

FIG. 1 shows a flowchart of the algorithm according to the present invention. The ring buffer of the present invention works as follows: the writer 101, who needs to write data into the buffer, where the data is of a certain size, checks the availability of space in the buffer (step 102). If there is insufficient space in the buffer, the writer exits the procedure (step 103). If there is sufficient free space in the buffer, then the writer registers: the writer reserves space in the buffer (step 104), and increases by 1 the number of active writers (step 105), at this point, locally.

Then, an atomic comparison (step 106) is performed on the current value of the start index with its local value, i.e., one received prior to the reservation. If the state of the buffer changed since the moment the registration process began (i.e., another writer moved rb→tail, which corresponds to global tail in FIG. 1), then this will result in an inequality— and the local structure is set equal to the global structure (step 107). The writer then enters a cycle of guaranteed wait, trying to repeat the registration procedure again, with new parameters for the buffer. If the global and local buffer structures are equal, in other words, the global state of the buffer have not changed, then, in step 108, rb→tail is moved to the position rb→tail+size, as the writer intended.

Then the writer becomes the active writer, and starts writing his data into the buffer, into the portion of the memory reserves for it (step 109). Note that the writing of the data into the buffer is inherently not an atomic operation. Then, the writer 101 is ready for the commit operation. However, since the buffer worked on the FIFO principle, the writer cannot always open his own data for reading. In a case where the writer who started writing second but finished writing first, then the data of both the first writer and the second writer will be open for reading only after the first writer finishes writing (i.e., he is the last one to finish writing).

When a writer finishes working with the buffer, he first reduces the counter (number of writers) by 1 (step 110), and then checks, in step 111, the counter of active writers. If the counter is 0, in other words, all the writers even if they did exist, have finished their writing process and this current writer is the start writer, then the writer 101 moves, in step 113, the point rb→write_idx. Then, as with the registration process, the writer checks, in step 106, whether the global structure of the buffer has changed during the copy time. If the state of the buffer changed since the writing began, then the local buffer data are set equal to the global buffer data (step 107), and the writer enters the guaranteed wait cycle, trying to repeat the permit procedure with new buffer parameters. This is necessary in order to insure that the information about the increase in a number of writers to the buffer, after the writer 101 has registered, becomes known to the writer 101, and to ensure than information about the reduction in the number of active writers, due to the exit of writer 101 from the writing process, is written into the buffer's global structure, and becomes known to the remaining writers. If the state of the buffer has not changed, then, in step 114, the writer finishes working with the buffer.

FIG. 2 illustrates the different states of the buffer 201 in a multiple writers no readers mode. rb→tail 205 is the index of the memory cell of the buffer, where the writing will begin (this corresponds to the global_tail in FIG. 1, and corresponds to rb→s.tail_idx in FIG. 3, and corresponds to the tail in a conventional ring buffer). The index is visible to all the active writers. Writer's count 209 is a global counter of the active writers. The buffer 201, itself is shown as an abstraction, and as a closed line in this figure.

Diagram A in FIG. 2 shows the first writer 101 has registered with the buffer 201: he has increased the local counter of active writers from 0 to 1 (diagram A shows the value of the global counter), reserved space in the memory 203, starting with the rb_tail 205. Prior to the reserving of the space and incrementing the counter, the writer 101 checked for availability of free space 204, which is done from inside of the reservation procedure.

Diagram B shows the first writer 101 has successfully exited the reservation procedure, and rb_tail 205 has changed to point to position rb_tail+size, where size is the amount of space reserved in the shared memory, has increased the global counter of writers, and has started writing his own entry 202.

Diagram C shows a state of the buffer when a second writer, writer2, designated by 207, has registered and has started its writing process (202), while the first writer 101 has not yet finished his writing process. During registration, the second writer has incremented the counter of active writers from 1 to 2, and when he began writing, rb_tail 205 has moved to position rb_tail+size2, where size2 is the amount of space 203 reserved by the second writer.

Diagrams D.1 and D.2 illustrate two different scenarios for two different writers.

Diagram D.1 shows that the second writer 207 finished the writing process 202 before the first writer 101 finishes his writing process. The second writer decrements that global counter of active writers from 2 to 1, and exits the buffer 201. His data 202 is, at the moment, not available for reading.

In diagram D.2, the first writer 101 finishes his writing process 202 prior to the second writer 207. Since his local counter of writer is equal to 1 (the first writer always starts with 1), then, when performing commit, he reduces this to 0, and therefore receives the right to move rb_write_idx (208), which is the address of the memory cell up to which data can be read by a reader. In other words, the first writer has opened his data for reading. However, in order to inform other writers about his own exit from the process (since in their local data of other writers, he is still counted in the global counter of active writers), the first writer 101 needs to do another iteration (no greater than the number of active writers) of the cycle in the function lrb commit write( ), in order to restore the correct global data structures rb→tail.u. As a result, in the global structure, the global counter of writers is decremented by 1.

Diagram E illustrates the final state of the multiple writers mode. Both writers have finished the writing process. The last writer who finished reduces the global counter of the writers from 1 to 0, and therefore was able to move the index rb_write_idx (208), which is the address of the memory cell of the buffer up to which data can be read from the buffer.

In standard ring buffer terminology, rb_read_idx can be referred to as the head, and the index rb_write_idx can be referred to as the tail. Everything between the head and the tail is available for reading. The space in the shared memory to the "right of the tail" is available for writing. In the initial state of the buffer, rb_read_idx=rb_write_idx. The buffer is called a ring buffer, because if there is available space 204 at the end of the line and the beginning of the line, writing can be done beginning from the free area at the end of the line, and ending with a free area in the beginning of the line.

Reading from the Buffer

The proposed method of conflict free and blocking free writing by multiple writers into a shared memory is an ideal fit for a single reader regime. Reading in a multiple reader regime is also possible, if some of the elements of the code for writing are transferred to the code for reading, such as the principle of atomicity of several operations. However, the efficiency of the process will be somewhat compromised, although the functionality of the system will be unaffected. For a more effective algorithm, a size of the buffer that is a power of two is preferred, which permits a maximum speed for reading and writing. Also, bit by bit instructions are used, which are usually faster than operations involving integer division, typically used with conventional operations with ring buffers.

Figure 6:
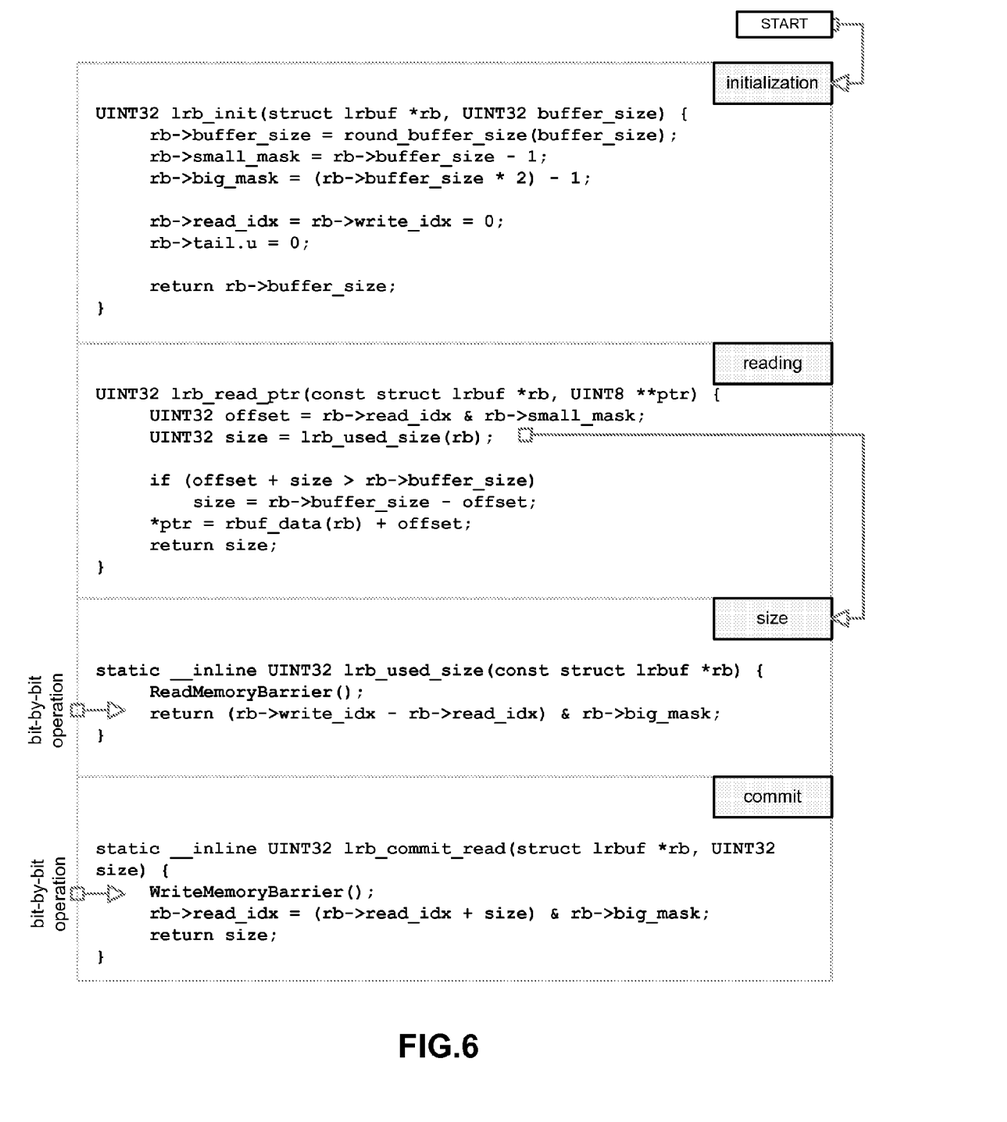
FIG. 6 shows code responsible for the reader from the ring buffer of the present invention.

The code illustrated in FIG. 6, in the function lrb_commit( ), the buffer is initialized. Its size is defined, which is less than or equal to the size of the original ring bugger, and which is related to the size by a power of two. Buffer masks are used, in order to utilize them in bit by bit instructions, to more rapidly identify the area where reading is done, and to move the head pointer to a new position after reading. The head and tail indices are set to 0, which indicates an empty buffer. The global structure rb_tail is also set to 0, which, for the first writer, identifies where his writing will begin, and the counter of writers is set to 0.

The function lrb_read_ptr( ) is used to identify the location and the amount of available data. First, the offset rb_read_idx (using the classic notation, head) is calculated relative to the start of the buffer. Then, the size of the buffer area that is available for reading is calculated, using the function lrb_used_size( ), where the logical AND operation is performed:

return($rb{\rightarrow}write\_idx-rb{\rightarrow}read\_idx$)
    &$rb{\rightarrow}big\_mask$;

which, in effect, is a fast bit by bit multiplication operation. Here, unlike conventional art, bit by bit operations are used to work with the ring buffer of the present invention. The conventional version of this typically looks as follows:

head=(head+size)%$rb\_size$

The remainder of the division is calculated, and this operation consumes a fair amount of processor cycles, since this is not a bit by bit operation.

Then, the reading of the data itself is performed, taking into account possible collisions due to the possible coincidence of head and tail pointers.

Figure 5:
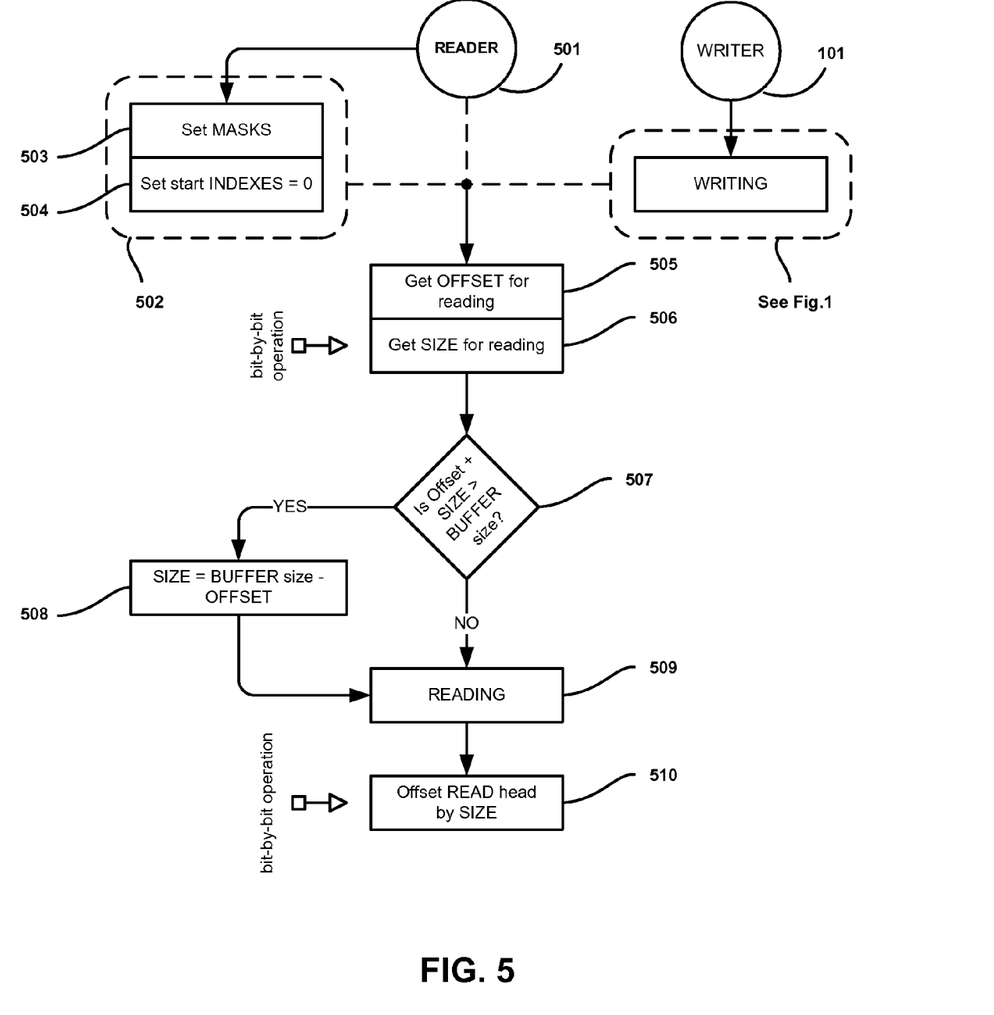
FIG. 5 is a schematic showing reading from the ring buffer.

After reading, the reader needs to move the head pointer freeing up space for subsequent writes. To do this, the function lrb_commit_read( ) is used. This is also a fast bit by bit operation:

rb→read_idx=(rb→read_idx+size)&rb→big_mask;

FIG. 5 illustrates a flowchart of how a reader 501 works with the buffer of the present invention. Once the buffer is created (step 502), and the writer 101 has written data into the buffer and has opened them for reading (see FIG. 1), the reader 501 can start the read process. The reader determines the offset of the memory cell where the data begins, relative to the start of the buffer (step 505), as well as the size of the data, in bytes or words, for reading (step 506). Note that the determination of the size can be done using a fast bit by bit operation. To avoid a situation where the area in a shared memory being read extends beyond the tail, a check is performed (step 507), and if size+offset>buffer_size, then the size is reset to the value buffer_size−offset (step 508). Then, the actual reading of the data itself is performed, for the given size (step 509).

To correctly complete the reading, the index rb→read_idx (head) has to be moved (step 510), so that the next read can be done using the new index, once a new data item is written to the buffer. The head is moved by the reader using a bit by bit multiplication operation.

Figure 7:
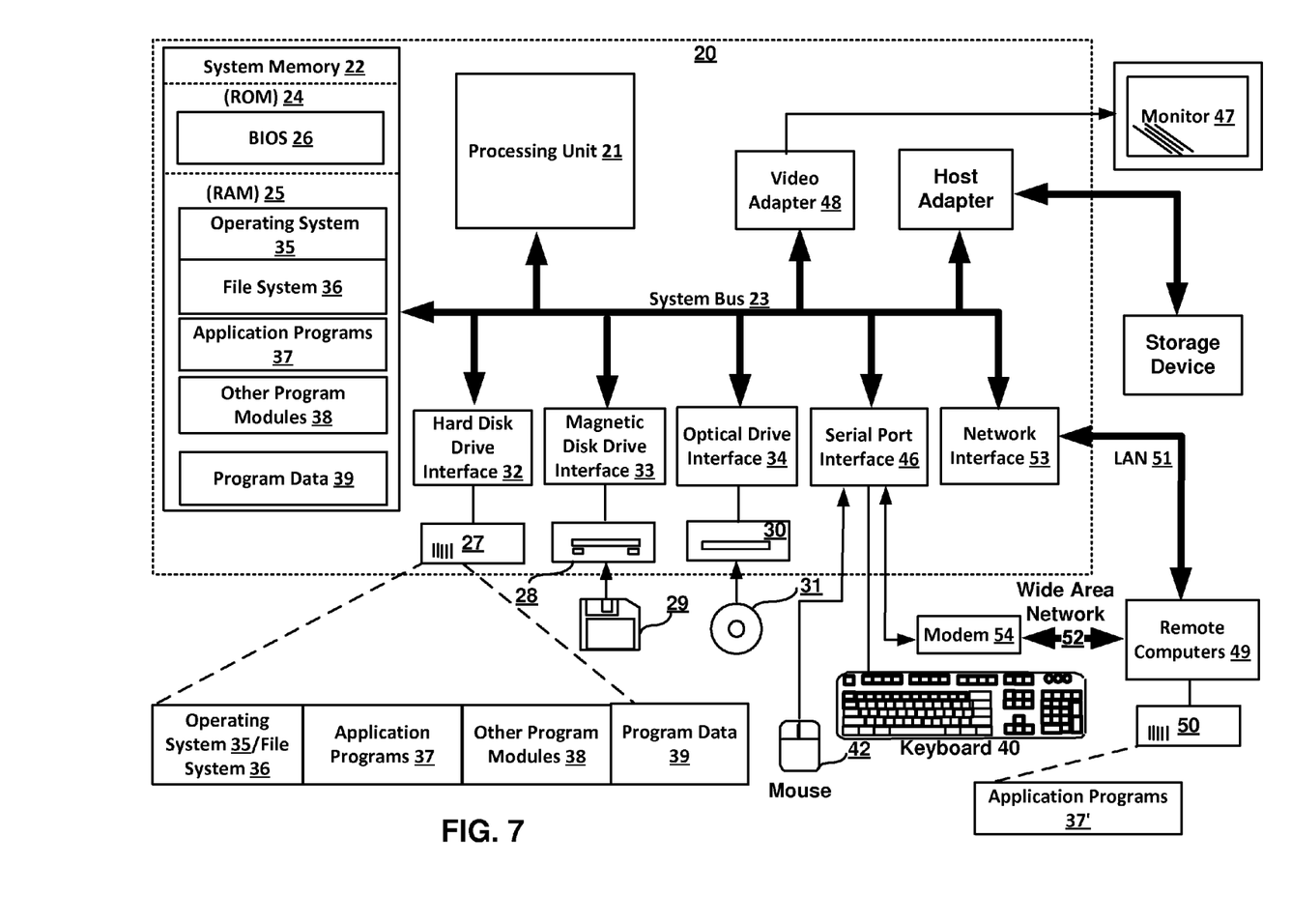
FIG. 7 illustrates a schematic diagram of an exemplary computer or server that can be used in the invention.

With reference to FIG. 7, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25.

A basic input/output system 26 (BIOS), containing the basic routines that help to transfer information between elements within the personal computer 20, such as during start-up, is stored in ROM 24. The personal computer 20 may further include a hard disk drive for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 120, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably WINDOWS™ 2000). The computer 20 includes a file system 36 associated with or included within the operating system 35, such as the WINDOWS NT™ File System (NTFS), one or more application programs 37, other program modules 38 and program data 39. A user may enter commands and information into the personal computer 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48.

In addition to the monitor 47, personal computers typically include other peripheral output devices (not shown), such as speakers and printers. A data storage device, such as a hard disk drive, a magnetic tape, or other type of storage device is also connected to the system bus 23 via an interface, such as a host adapter via a connection interface, such as Integrated Drive Electronics (IDE), Advanced Technology Attachment (ATA), Ultra ATA, Small Computer System Interface (SCSI), SATA, Serial SCSI and the like.

The computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the computer 20.

The computer 20 may further include a memory storage device 50. The logical connections include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46.

In a networked environment, program modules depicted relative to the personal computer 20, or portions thereof, may be stored in the remote memory storage device. It will be appreciated that the network connections shown are exemplary and other means of establishing a communications link between the computers may be used.

Having thus described the different embodiments of a system and method, it should be apparent to those skilled in the art that certain advantages of the described method and apparatus have been achieved. In particular, it should be appreciated by those skilled in the art that the context even logging method and system provide for logging the events without locking the contexts.

It should also be appreciated that various modifications, adaptations, and alternative embodiments thereof may be made within the scope and spirit of the present invention. The invention is further defined by the following claims.

APPENDIX

```
static INT32 lrb_write_reserv(struct lrbuf *rb, union shadow_tail *curr,
    UINT32 size)
{*Start and finish of writer(user) registration*
    union shadow_tail next;
    union shadow_tail prev;
    INT32 off;
    curr→u=AtomicRead64U(&rb→tail.u);
    while (1) *Check for free space inside the buffer, atomic reservation of buffer memory and update of registered users' (writers') records, including update of records of the next data block address and free space in FIFO buffer* {
        UINT32 used;
        ReadMemoryBarrier( );
        used=(curr→s.tail_idx-rb→read_idx) & rb→big_mask;
        if (rb→buffer_size-used<size)
            return-1;
        next.s.tail_idx=curr→s.tail_idx+size;
        next.s.users=curr→s.users+1;
        prev.u=AtomicCompareSwap64U(&rb→tail.u, curr→u, next.u);
        if (prev.u==curr→u)
            break;
        curr→u=prev.u;
    }
    off=curr→s.tail_idx & rb→small_mask;
    curr→u=next.u;
    return off;
}
*Write data into "reserved" memory area, make mark indicating that context has completed write*
static void lrb_commit_write(struct lrbuf *rb, union shadow_tail *curr)
{
    union shadow_tail next;
    union shadow_tail prev;
    while (1) {
        next.s.tail_idx=curr→s.tail_idx;
        next.s.users=curr→s.users-1;
        if (next.s.users==0)
            *(volatile UINT32*)&rb→write_idx=curr→s.tail_idx;
        prev.u=AtomicCompareSwap64U(&rb→tail.u, curr→u, next.u);
        if (prev.u==curr→u)
            break;
        curr→u=prev.u;
    }
}
//
*Implementation of continuous (uninterrupted write) into buffer *
//one step write to buffer
//
UINT32 lrb_write(struct lrbuf *rb, const void *src, UINT32 size)
{
    INT32 off;
    UINT32 written=0;
    union shadow_tail curr;
    off=lrb_write_reserv(rb, &curr, size);
    if (off>=0) {
        UINT32 size1=size;
        if (off+size1>rb→buffer_size) {
            size1=rb→buffer_size-off;
            rbuf_memcpy(rbuf_data(rb), (UINT8*)src+size1, size-size1);
        }
        rbuf_memcpy(rbuf_data(rb)+off, src, size1);
        written=size;
    }
    lrb_commit_write(rb, &curr);
    return written;
}
```

What is claimed is:

1. A system for working with shared memory of a computer, comprising:
   a) a plurality of contexts, each having executable processes writing and reading log data;
   b) a ring buffer in the shared memory for writing and reading log data by the plurality of contexts;
   c) a software primitive for managing access attempts by the contexts to the ring buffer;
   d) wherein each context, upon writing to the ring buffer, is allocated an amount of space requested by the context, up to a maximum available amount of space in the ring buffer at any moment in time;
   e) wherein the software primitive guarantees consistency of the log data written to the ring buffer, where entries from the same context are grouped together for writing and reading;
   f) wherein the software primitive permits simultaneous writing into the ring buffer by multiple contexts;
   g) wherein a context that finished writing last opens for reading log data of all other contexts in the ring buffer;
   h) wherein a context that finished writing can open its log data for reading by other contexts;
   i) wherein, after finishing writing to the ring buffer, the context updates a state of the buffer by decrementing the count of the active writers and/or by shifting the permission pointers for communicating with writers and readers; and
   j) wherein a context can read from the buffer only the log data that is marked as valid for reading by the context that wrote that data.

2. The system of claim 1, wherein the ring buffer is a First In, First Out (FIFO) buffer.

3. The system of claim 1, wherein ring buffer writes and reads are done without utilizing spinlocks.

4. The system of claim 1, wherein space in the ring is allocated within a guaranteed write cycle with no more iterations than a number of contexts waiting for their turn to write to the ring buffer.

5. The system of claim 1, wherein, after registering with the ring buffer and after exiting writing to the buffer, each context reads global variables representing a state of the ring buffer, and updates the global variables based on his local variables,
   wherein the global variables include an address of a next write and a number of contexts currently writing to the ring buffer.

6. The system of claim 1, wherein, after registering with the ring buffer, each context updates global variables of the ring buffer that are also visible to other contexts, the updates including:
   incrementing a number of contexts writing to the ring buffer; and
   modifying an address of a next write.

7. The system of claim 1, wherein, after exiting writing from the ring buffer, the context updates a global state of the ring buffer, including:

decrementing a number of contexts writing to the ring buffer; and modifying an address of a read.

8. The system of claim 1, further comprising deleting of the log data from the ring buffer after reading it, and modifying an address of a data that have been read already, thereby freeing up this space for writing to it.

9. The system of claim 1, wherein multiple contexts can write concurrently to the ring buffer with multiple contexts reading from the buffer without conflicts.

10. The system of claim 1, wherein the log data includes any data of the context.

11. The system of claim 1, wherein the context is any of:

a virtual machine (VM) process;

a user application;

a user space process;

a Virtual Machine Monitor process; and a process within a Hypervisor.

* * * * *